March 20, 1962  B. VER NOOY  3,025,885
PIPE LINE PLUGGER
Filed March 16, 1959　　　　　　　　　　　　　　　　2 Sheets-Sheet 1
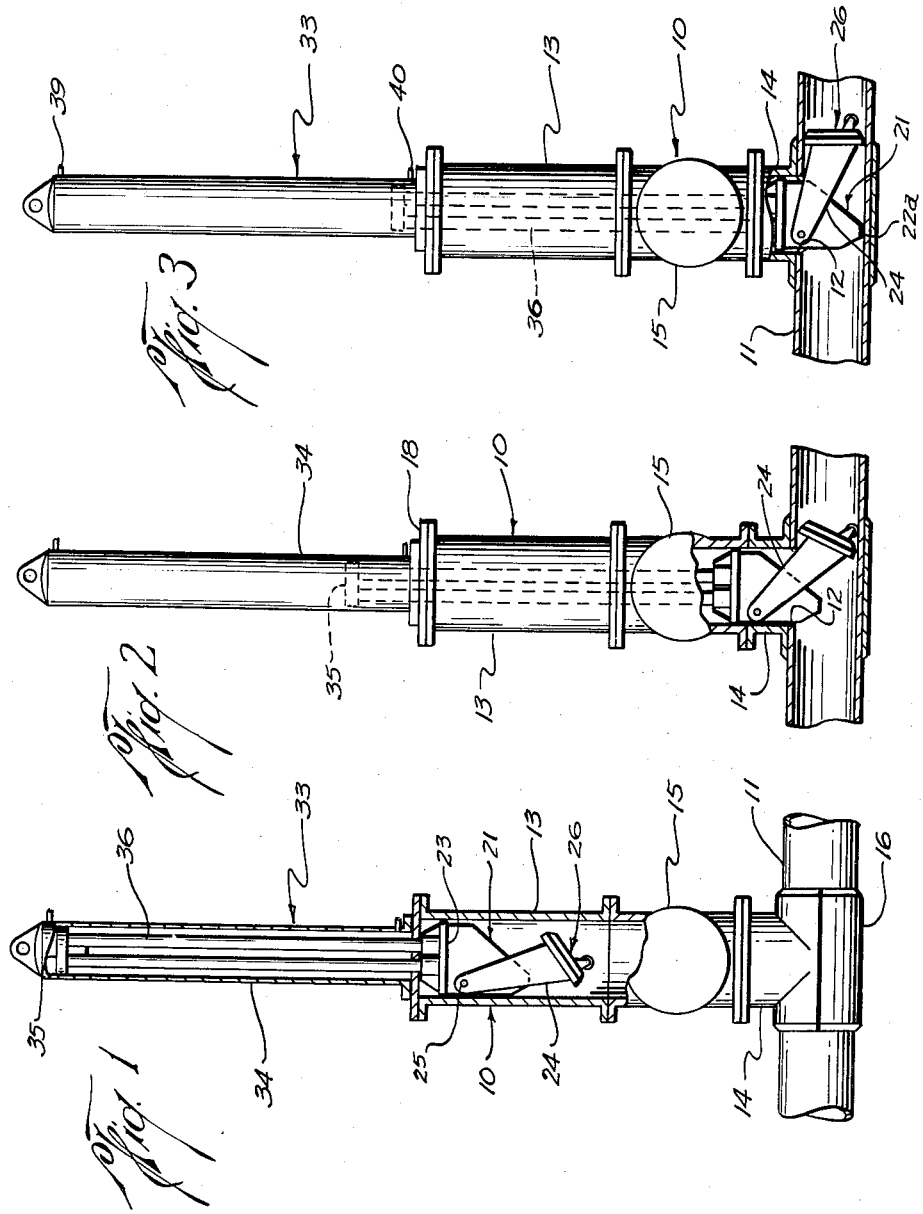
Burton Ver Nooy
INVENTOR.
BY
Browning, Simms, Ayer
& Eickenroht
ATTORNEYS

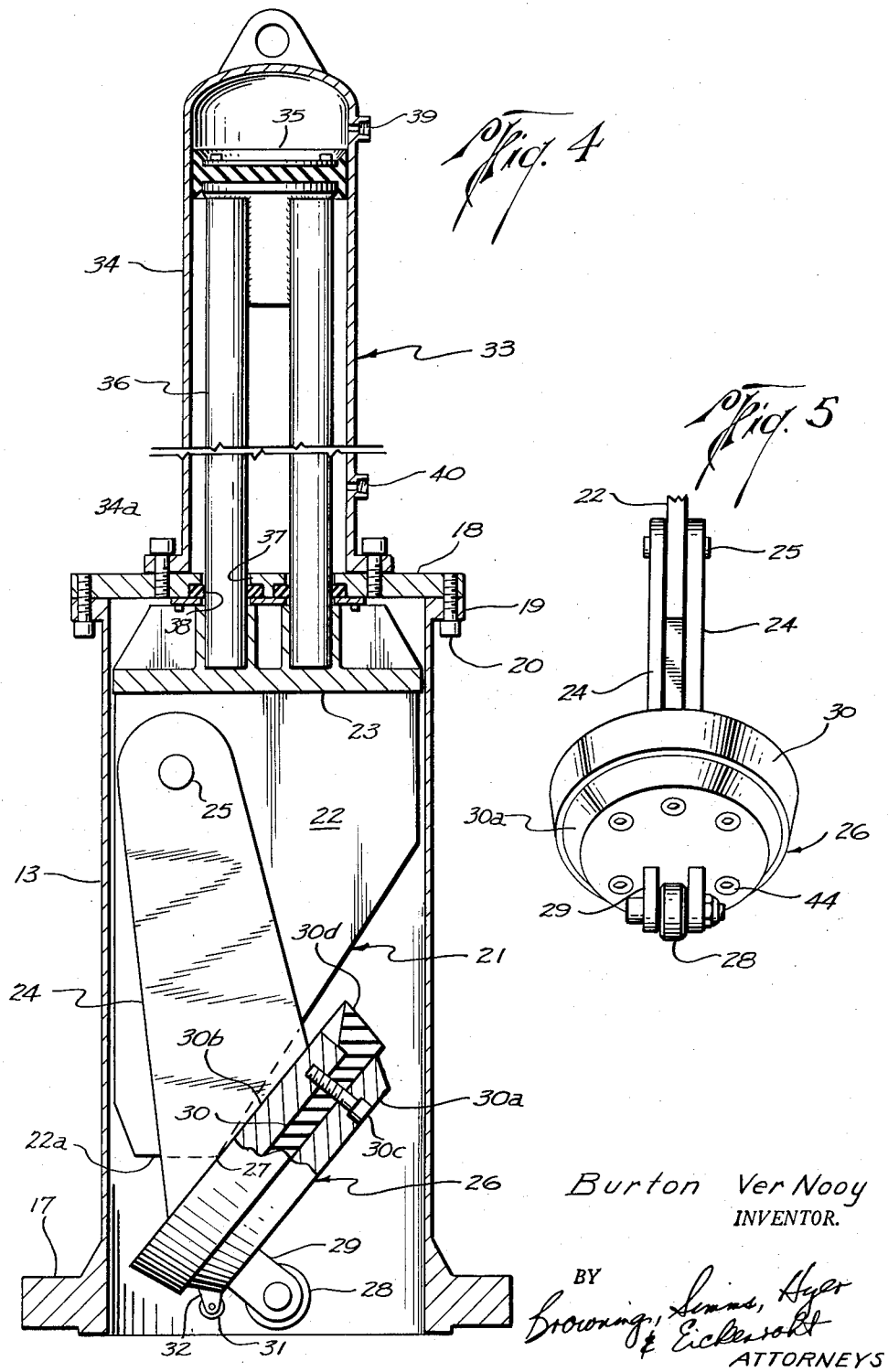

3,025,885
PIPE LINE PLUGGER
Burton Ver Nooy, Tulsa, Okla., assignor to
T. D. Williamson, Inc., Tulsa, Okla.
Filed Mar. 16, 1959, Ser. No. 799,730
6 Claims. (Cl. 138—94)

This invention relates to a pipe line plugger of the general type having a plug member insertable across a line through a lateral opening in the line. More particularly, this invention is an improvement over that disclosed in my copending application, Serial No. 669,380, entitled "Pipe Line Plugger," and filed July 1, 1957, now U.S. Patent No. 2,906,295, of which the present invention is a continuation-in-part.

As mentioned in the aforesaid copending application, it is often necessary in the maintenance of a pipe line to isolate a portion of the line in order that such portion can be repaired, replaced, or alterations made therein. For example, should a section of pipe line become ruptured and spring a leak, it is desirable to isolate such section from fluid communication with adjacent portions of the line. Upon being isolated, only the isolated section need be drained for repairs, the remainder of the line remaining full of fluid. It will be understood that such isolation should be performed without loss of pressure from within the line, and for this purpose pluggers have been provided with fluid-tight housings mountable on the line in surrounding relation to a lateral opening therein to permit a plug member to be moved from the housing into the line.

As further pointed out in my copending application, conventional pluggers of this type have employed a carrier movable axially within the housing and having the expandable valve means connected thereto for movemtnt through the lateral opening therein and across the line, whereupon the valve means may be expanded to form a plug sealing such line. For this purpose, the valve means frequently comprises a rubber boot or strip having a mechanism internally of the carrier for expanding the boot or strip into sealing engagement with the inner walls of the pipe line. This arrangement requires at least two mechanisms which must be actuated separately: (1) A carrier for moving the valve means into the pipe line, and (2) the mechanism internally of the carrier for expanding the valve means after it has been situated across the line. Not only is such an apparatus unduly complicated and time consuming to operate, but also it has been found difficult to design one of this type sufficiently strong to withstand the high pressures often encountered in pipe lines.

Still further, conventional pluggers of the type above-described necessarily require that a seal be provided not only between the valve means of the plug member and the pipe line, but also between the carrier for the plug member and the housing in which said carrier is movable. That is, inasmuch as the plug member is disposable across the line axially of the aforesaid opening, it will seal only with the interior of the line at opposite sides of the lateral opening. Thus, unless the additional seal is formed about the carrier, fluid may flow past the plug member through the portion of the line intersected by the lateral opening. Obviously, the necessity for a plurality of seals further enhances the possibility of leakage.

The pipe line plugger disclosed in my copending application solved many of the problems presented by the prior art structures by the provision of (1) a plug member having relatively rigid lateral dimensions with a seal surface about the periphery thereof for engagement with the inside diameter of the pipe, and (2) a mechanism for moving the plug member across the line through the opening and laterally into sealing engagement with the inside diameter of the line to one side of such opening. A plugger of this type required neither a separate mechanism for mechanically expanding a valve means on the plug member nor an additional seal between the carrier for the plug member and the housing.

In accordance with my earlier invention, this mechanism included a parallelogram linkage pivotally connecting the plug member to the carrier to support it within the housing with its lowermost portion laterally offset from the pivotal connection of the linkage to the carrier. Thus, as the carrier was moved toward the pipe, the plug member was moved out of the housing and into engagement with the inside of the pipe opposite the opening therein. Upon continued movement of the carrier toward the pipe, the linkage was swung in a direction to move the plug member laterally into sealing engagement across the pipe to the one side of the opening therethrough. Upon movement of the carrier away from the pipe, the linkage was swung in an opposite direction to move the plug member laterally out of sealing engagement with the pipe, and the plug member was then returned to its original position within the housing.

An object of this invention is to provide a pipe plugger of the same general type as my earlier invention but having a more simplified and compact arrangement for so moving the plug member; and, more particularly, which does not require a parallelogram linkage.

This and other objects are acomplished, in accordance with the present invention, by a pipe plugger which comprises, as in my earlier invention, a fluid-tight housing mountable on a side of the pipe in surrounding relation to the opening therethrough, a carrier mounted on the housing for movement therein toward and away from the pipe, and a plug member adapted to seal across the inside of the pipe to one side of the opening therethrough.

However, as distinguished from my earlier invention, an arm is swingably connected to the carrier and fixedly connected to the plug member to support it within the housing in one position of the carrier. Suitable means, such as a stop on the carrier engageable with the plug member, are provided for locating the plug member, as the carrier is moved from its one position toward the pipe and the lowermost portion of the plug member engages the inside of the pipe opposite the opening therethrough, with its lowermost portion laterally offset from the swinging connection of the arm to the carrier in a direction toward the one end of the opening. Thus, upon continued movement of the carrier toward the pipe, the arm is swung in a direction to move the plug member laterally into sealing engagement across the pipe to said one side of the opening through the pipe.

Of course, as in my earlier invention, the plug member is returned to its original position upon movement of the carrier away from the pipe into its one position. That is, the arm is swung in an opposite direction to move the plug member laterally out of sealing engagement across the pipe, and the plug member is then moved upwardly into supported position within the housing.

This simplified arrangement for moving the plug member is made possible by predetermining the orientation of the plug member with respect to the arm necessary to dispose the plug member in the desired sealing position across the pipe. That is, as distinguished from my earlier invention wherein the parallelogram linkage causes the plug member to move laterally without turning, the plug member of the present invention has a simultaneous lateral and turning movement.

Preferably, the lowermost portion of the plug member comprises a rotatable roller for reducing the frictional resistance to this sliding and turning of the plug member against the pipe during its initial lateral movement into sealing engagement across the pipe and its final lateral movement out of sealing position. The plugger may also include an additional rotatable roller engageable with the pipe after and prior to movement of the first-mentioned roller respectively out of and into engagement with the pipe during its lateral movement. Obviously, this additional roller further reduces the frictional resistance to sliding and turning of the plug member during other stages of its lateral movement.

In the drawings, wherein like reference characters are used throughout to designate like parts:

FIG. 1 is a schematic elevational view of an illustrative embodiment of a pipe plugger constructed in accordance with the present invention and installed on a pipe line, the upper portion of the housing being broken away to show the plug member in a retracted position therein;

FIG. 2 is a view similar to FIG. 1, but in which the lower portion of the housing and the pipe line are broken away to show the plug member during an intermediate stage of its insertion into sealing position across the pipe;

FIG. 3 is a view similar to FIG. 2, but in which the plug member has been moved into sealing position across the pipe line;

FIG. 4 is a vertical cross-sectional view of the pipe plugger shown in FIGS. 1 to 3; and FIG. 5 is a front elevational view of the plug member and supporting arm therefor.

Referring now in detail to the above-described drawings, the pipe plugger will be seen from FIGS. 1 to 3 to include a housing 10 mounted on the side of a pipe line 11 in surrounding relation to an opening 12 through the pipe line which, as shown, is of approximately the same diameter as the inside of the pipe line. This housing includes an upper tubular part 13, a lower T branch 14, and a gate valve 15 connected therebetween to form a fluid-tight closure communicating with the interior of the pipe line through opening 12. As shown, the T branch 14 comprises part of a saddle 16 which is welded to the pipeline, although it may comprise an integral fitting in the line. The components of the housing are axially aligned with one another and have inside diameters corresponding to the side opening 12 in the pipeline.

As more fully described in my earlier application, the side opening 12 has been formed in the pipe line prior to installation of the equipment shown. That is, a suitable tapping machine has been mounted above the gate valve 15, similarly to tubular part 13, while the gate valve is closed to contain the pressure within the line. Then, upon opening of the gate valve, a bit on a boring bar mounted on the tapping machine has been lowered through the gate valve and T to drill the opening 12. Upon withdrawal of the bit into the tapping machine, the gate valve has again been closed and the tapping machine removed and replaced by the tubular part 13. Upon reopening of the gate valve 15, the tubular part forms a continuation of the housing 10 in communication with the interior of the line.

Referring now to FIG. 4, the tubular part 13 is provided with a flange 17 at its lower end for connection to the gate valve, and is closed at its upper end by means of a head 18 threadedly connected to an upper flange 19 by means of bolts 20. The carrier, which is designated in its entirety by numeral 21, is mounted on the housing, in a manner to be described hereinafter, for movement longitudinally within the housing toward and away from the pipe line 11. This carrier includes a flange 22 which depends from an upper circular head 23 having an outer diameter closely approximating the inside diameter of the housing.

A pair of arms 24 are pivotally connected by means of a pin 25 to opposite sides of the carrier flange 22 for swinging about an axis transverse to the movement of the carrier within the housing as well as to the axis of the pipe line 11. Although a pair of arms are preferred in the structure shown to provide a balanced construction, a single arm could be mounted between spaced apart flanges.

A disc-shaped plug member 26 is fixedly secured to the free ends of the arms 24, and an edge 27 on the carrier flange 22 is engageable with the back side of the plug member when it is supported within the housing, as shown in FIGS. 1 and 4. A roller 28 rotatably mounted upon brackets 29 on the front side of the plug member constitutes the lowermost portion of the plug member and is so related to the edge 27 on the flange 22, which serves as a stop that its lower edge is laterally offset from the pivotal axis of the arms 24 in a direction toward the one side (to the right) of the opening 12 of the pipeline.

Obviously, this lowermost portion of the plug member may constitute some other part of the plug member although, for reasons noted below, the rollers have an added function for which they are preferred.

In any case, as the carrier moves toward the pipe line, the roller 28 or other lowermost portion thereof engages the inside of the pipe line opposite the opening 12 and, since this portion of the plug member is laterally offset in the manner described, the arms 24 will swing in a counterclockwise direction to move the plug member laterally into the one side of the pipe line, as shown in FIG. 2. When the plug member reaches the sealing position of FIG. 3, the lower edge 22a of the flanges 22 engages the inside of the pipe line to stop further downward movement of the carrier.

As previously described, due to the fact that the plug member is fixed to the arms, it will turn as it moves laterally. Thus, if it is desired to dispose the plug member in a transverse sealing position, as shown in FIG. 3, it is necessarily disposed in an angular position with respect to the housing when disposed therein. However, it should be understood that the sealing position of the plug member may be other than normal to the pipe line, in which case its shape will be elliptical and its position within the housing would be changed accordingly.

It is contemplated that T 14 and housing 13 may be disposed at an angle other than 90 degrees with the pipeline, and that roller 28 or equivalent part of the plug first making contact with the inner wall of the pipe line will do so at a point toward which the carrier moves.

The plug member comprises a sealing cup 30 held between a front plate 30a secured to a back plate 30b by means of bolts 30c extending through the cup. Lips on the rearwardly turned flanges 30d of the cup form pressure energized seals with respect to the fluid behind the plug member in its sealing position. As shown in FIG. 4, the arms 24 are secured to the back plate 30b while the bracket 29 is secured to the front plate 30a.

As previously mentioned, the rotatable roller 28 lessens the frictional resistance to the simultaneous turning and sliding movement of the plug member against the pipe line during the initial lateral movement thereof toward sealing position and final lateral movement thereof away from sealing position. It should be noted that the lateral component of force for moving the plug member is least during these stages of its movement and, furthermore, that the vertical component of force thereon is at a maximum during this stage, such that the need for friction-free travel is most critical.

As the plug member continues to turn during lateral sliding movement toward sealing position, the roller 28 will be moved out of engagement with the pipe line. However, in the form of the invention shown in FIG. 4, an additional roller 31 is mounted on the lower edge of the front plate 30a of the plug member by means of bracket 32 in position to rotatably engage the pipe during this further lateral movement of the plug member. When the plug member has been turned further so that the lower roller 31 is also moved out of engagement with the pipe line, the lateral component of force on the plug member has approached its maximum so that the problem of friction is the least critical. If desired, the auxiliary rollers 31 may be eliminated.

The carrier 21 of the pipe plugger is mounted upon the housing and moved therein toward and away from the pipe line by means of an hydraulic actuator 33 or other suitable means. As shown in FIG 4, this actuator includes a cylinder 34 having its lower end bolted as at 34a to the head 18 on the tubular part 13 and a piston 35 sealably reciprocable within the cylinder. Rods 36 are connected to the piston at their upper ends and extend downwardly through openings 37 in the head 18 for connection at their lower ends with the head member 23 of the carrier. More particularly, seal rings 38 are mounted in the head 18 to form a sliding seal about the rods, and the cylinder 34 is provided with upper and lower ports 39 and 40, respectively, for admitting and withdrawing hydraulic fluid with respect to opposite sides of the piston 35 so as to selectively move the carrier toward and away from the pipe line.

Referring now to the over-all operation of this pipe plugger, and assuming that the plug member 26 is supported by the carrier 21 within the housing, as shown in FIG. 1, hydraulic fluid is first admitted through port 39 to the upper side of piston 35. This moves the piston downwardly so as to move the carrier 21 toward the pipeline 11. When the carrier has been lowered sufficiently so as to cause the roller 28 of the plug member to engage the inside of the pipe line opposite the opening 12, continued downward movement of the piston will cause the arms 24 to swing in a counterclockwise direction such that the plug member moves laterally into the pipe line to the right side of the opening 12. When the plug member reaches its sealing position across the pipe line, the lower end 22a of the carrier flange 22 will engage with the inside of the pipe line to prevent further downward movement of the carrier.

When the plug member is to be removed from sealing position, hydraulic fluid is admitted to the lower side of the piston 35 through the port 40. As the piston is thus moved upwardly, the carrier 21 is moved away from the pipe line. Since the plug member is disposed within the pipe line, the arms 24 are swung in a clockwise direction as the plug member moves laterally to the left or out of sealing engagement across the pipe line. When movement of the carrier 21 away from the pipe has progressed to a point that the plug member is removed from the side of the pipe line to the right of the opening 12, the back plate thereof will engage with the stop 27 on the carrier flange 22 where it will be supported during withdrawal from the pipe line and into the housing upon continued upward movement of the piston 35.

When the plug member has been withdrawn into the tubular part 13 of the housing, the gate valve 15 may be closed, and the tubular part and the plug member disposed therein may be removed for replacement or repair.

From the foregoing it will be seen that this invention is one well adapted to attain all of the ends and objects hereinabove set forth, together with other advantages which are obvious and which are inherent to the apparatus.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

The invention having been described, what is claimed is:

1. A pipe plugger having a plug member insertable into a side opening in a pipeline comprising in combination a housing adapted to enclose a side opening into a pipe; a carrier mounted for longitudinal reciprocating movement in the housing; a plug member movable by the carrier to and from a pipe plugging position laterally offset from the housing; an arm fixed to the plug member at an acute angle to a face thereof and pivoted to the carrier at a location to extend the arm obliquely downward therefrom to the plug member in pipe plugging position; and a stop on the carrier disposed to support a downward component of a force applied normal to a face of the plug member in pipe plugging position.

2. A pipe plugger having a plug member insertable into a side opening in a pipe comprising in combination a fluid-tight housing adapted to enclose a side opening into a pipe; a carrier mounted in the housing for longitudinal reciprocating movement therein; a plug member movable to and from a pipe plugging position laterally offset from the housing by reciprocation of the carrier; an arm connected to the carrier on a pivot transverse to the housing and extending obliquely downward therefrom to the plug member in pipe plugging position and means on the carrier spaced from said arm for supporting a downward component of force applied normal to a face of the plugging member in pipe plugging position.

3. A pipeline plugger having a plug member insertable into a side opening in a pipe comprising in combination a fluid-tight housing adapted to enclose a side opening into a pipe; a carrier mounted for longitudinal reciprocating movement in the housing; a plug member movable by the carrier between a pipe plugging position laterally offset from the housing and a position in the housing; an arm fixed to the plug member at an angle oblique to a face thereof and pivoted to the carrier at a location to extend obliquely downward therefrom to the plug member in pipe plugging position; means, on the carrier, for holding the plug member laterally offset from its pivotal axis when the plug member is in the housing and means on the carrier below said arm for supporting a downward component of force applied normal to a face of the plug member in pipe plugging position.

4. The pipe plugger of claim 3 wherein the means for holding the plug member laterally offset from the pivotal axis of the arm comprises a flange on a carrier disposed to stop swinging movement of the plug member in direction opposite to pipe plugging position.

5. A pipe plugger having a plug member insertable into a side opening in a pipe comprising in combination a fluid-tight housing adapted to enclose a side opening into a pipe; a carrier mounted for longitudinal reciprocating movement in the housing; a plug member movable by the carrier between a pipe plugging position laterally offset from the housing and a position in the housing; an arm fixed to the plugging member at an angle oblique to a face thereof and pivoted to the carrier at a location to extend obliquely downward therefrom to the plug member in pipe plugging position; means, on the carrier, for holding the plug member laterally offset from the pivotal axis of the arm when the carrier is in the housing; and a member on the carrier below said arm disposed to support a downward component of a force applied normal to a face of the plug member in pipe plugging position.

6. The plugger of claim 5 in which the means for holding the plug member laterally offset from the pivotal axis of the arm comprises a flange on the carrier.

References Cited in the file of this patent

UNITED STATES PATENTS

| | | |
|---|---|---|
| 1,181,984 | Arni | May 9, 1916 |
| 2,327,615 | Ankarle | Aug. 24, 1943 |
| 2,813,778 | Ver Nooy | Nov. 12, 1957 |